United States Patent Office 3,823,176
Patented July 9, 1974

3,823,176
ESTER-CONTAINING AMINE-BASED LIQUID POLYOLS AND USE IN PREPARATION OF URETHANE COMPOSITIONS
William W. Levis, Jr., Wyandotte, and Louis C. Pizzini, Trenton, Mich., assignors to BASF Wyandotte Corporation, Wyandotte, Mich.
No Drawing. Continuation-in-part of application Ser. No. 728,814, May 13, 1968, now Patent No. 3,585,185. This application May 7, 1971, Ser. No. 141,408
Int. Cl. C07c 101/00
U.S. Cl. 260—468 J  8 Claims

ABSTRACT OF THE DISCLOSURE

Ester-containing amine-based liquid polyols are prepared by the reaction of alkylene oxide condensates of amines with halogen-containing organic acid anhydrides and alkylene oxides. The polyols are particularly useful in the preparation of flame-retardant polyurethane foams.

---

The present application is a continuation-in-part of U.S. Ser. No. 728,814 filed May 13, 1968, now U.S. Pat. No. 3,585,185.

The invention relates to ester-containing amine-based liquid polyols and to the use thereof in the preparation of urethane compositions. More particularly, the invention relates to ester-containing amine-based liquid polyols having halogen atoms chemically bound therein and to the use thereof in the preparation of flame-retardant polyurethane foams.

It has become increasingly important to impart flame-resistant properties to polyurethane plastics. This is particularly true where cellular polyurethanes are used, for example, as insulation, and to prevent the risk of fire in the daily use of other items. Numerous methods are known for imparting flame-resistant properties to polyurethane plastics. For example, in the production of the cellular polyurethanes one may use halogenated compounds or derivatives of acids of phosphorus as the active hydrogen-containing component and thus impart flame resistance. It is also possible to use compounds of antimony or boron. Moreover, non-reactive phosphorus or halogen-containing compounds may be used as additives for this purpose. All of these substances are capable of imparting some flame-resistant properties to polyurethane foam plastics. However, a disadvantage associated with these substances is that the use of increasing quantities leads to a serious impairment of the mechanical and physical properties of the cellular polyurethanes. Moreover, as the quantity of the flame-resisting agents is increased, the problem of mixing the components containing the flame-resisting agent with the balance of the components leading to the production of a cellular polyurethane plastic is increased.

It is an object of the present invention to provide novel ester-containing amine-based liquid polyols which impart flame-resistant properties to polyurethane compositions and which are substantially devoid of the foregoing disadvantages. It is a further object of the present invention to provide polyurethane compositions useful in the preparation of foams, adhesives, binders, laminates, and coatings. These and other objects of the present invention will be apparent from the specification and examples which follow.

The above objects are accomplished in accordance with the present invention by providing novel ester-containing amine-based liquid polyols having halogen atoms chemically bound therein and which are of relatively low viscosity. The novel ester-containing polyols of the present invention are prepared by the reaction of alkylene oxide condensates of amines having at least two active hydrogen atoms with a halogen-containing organic acid anhydride and an alkylene oxide.

As mentioned above, there are three essential reactants employed in the preparation of the ester-containing polyols of the present invention, namely, an alkylene oxide condensate of an amine having at least two active hydrogen atoms, a halogen-containing organic acid anhydride, and an alkylene oxide. Alkylene oxides which may be employed in the preparation of the ester-containing polyols of the present invention include ethylene oxide, propylene oxide, the isomeric normal butylene oxides, hexylene oxide, octylene oxide, dodecene oxide, methoxy and other alkoxy propylene oxides, styrene oxide, and cyclohexane oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

Alkylene oxide condensates of amines having at least two active hydrogen atoms which may be employed in the preparation of the ester-containing polyols of the present invention are generally prepared by the catalytic condensation of an alkylene oxide or mixture of alkylene oxides either simultaneously or sequentially with an amine having at least two active hydrogen atoms. Any of the alkylene oxides mentioned above may be employed with propylene oxide and ethylene oxide being preferred. Representative amines include aliphatic amines having from one to twenty carbon atoms, such as methyl amine, ethyl amine, propyl amine, butyl amine, octyl amine, decyl amine, dodecyl amine, cetyl amine, ethylene diamine, propylene diamine, butylene diamine, diethylene triamine, dipropylene triamine, and triethylene tetramine; aromatic amines having from six to tweleve carbon atoms such as toluene diamine, aniline, methylene dianiline, naphthalene diamine, polymeric compositions of methylene dianiline and condensation products of formaldehyde and aniline, o-chloroaniline, and/or toluidine; heterocyclic amines such as piperazine and trialkanolamines such as triethanol amine, triisopropanol amine, and tributanol amine. Generally, the condensates useful in the present invention will have a molecular weight between 100 and 10,000, preferably between 300 and 6,000.

In the preparation of the ester-containing amine polyols of the subject invention, it is also possible to employ a hydroxyl-containing compound as a coinitiator with the above-described condensates. Any of the many hydroxyl-containing compounds known in the art as evidenced by U.S. Pats. Nos. 1,922,459, 3,190,927, and 3,346,557 may be employed. Particularly preferred coinitiators include those hydroxyl-containing compounds prepared by the reaction of propylene oxide with acids of phosphorus having a $P_2O_5$ equivalency of from 72 to 95 percent.

The third reactant employed in the preparation of the ester-containing polyols is a halogen-containing organic acid anhydride. Typical anhydrides are halogenated polycarboxylic acid anhydrides such as dichloromaleic anhydride, tetrabromophthalic anhydride, tetrachlorophthalic anhydride, 1,4,5,6,7,7-hexachlorobicyclo (2.2.1)-5-heptene-2,3 - dicarboxylic anhydrides, hereinafter called chlorendic anhydride, 1,4,5,6,7,7-hexachloro-2-methylbicyclo(2.2.1)-5-heptene-2,3-dicarboxylic anhydride, 1,4,5,6,7,7 - hexachlorobicyclo(2.2.1)-5-heptene-2-acetic-2-carboxylic anhydride, 5,6,7,8,9,9-hexachloro-1,2,3,4,4a,5,8,8a-octahydro-5,8-methano-2,3-naphthalene dicarboxylic anhydride, and 1,2,3,4,5,6,7,7-octachloro-3,6-methanol-1,2,3,6-tetrahydrophthalic anhydride. Mixtures of any of the above anhydrides may also be employed as well as mixtures of the above anhydrides and nonhalogenated anhydrides such as phthalic anhydride, maleic anhydride, and trimellitic anhydride.

The ester-containing polyols of the present invention are generally prepared by heating the three reactants at temperatures between 50° C. and 150° C., preferably between 75° C. to 150° C., for 0.5 to 10 hours. Temperatures below 150° C. must be maintained to prevent the reaction of carboxy and hydroxy groups with the formation of water. The reaction is generally carried out under from zero to 100 p.s.i.g. Alternatively, the alkylene oxide condensates and the halogen-containing organic acid anhydride may be added to a reaction vessel and heated to 50° C. to 150° C. for zero to ten hours. Thereafter, the alkylene oxide is added to the reaction mixture under pressure while maintaining the reaction temperature of betweeen 75° C. and 150° C. After completion of the reaction, the reaction mixture may be filtered and is stripped of volatiles by heating for about one-half hour to three hours at 80° C. to 110° C. under less than 10 mm. of mercury. If desired, a solvent inert to the reaction may be employed in the preparation of the polyols of the present invention.

The amounts of reactants employed in the preparation of the ester-containing polyols of the present invention may vary. Generally, however, a mole ratio of alkylene oxide condensate to anhydride of from 1:0.1 to 1:6, preferably from 1:0.1 to 1:1, will be employed. The amount of alkylene oxide employed will be such to reduce the acid number of the alkylene oxide condensate-anhydride reaction mixture to five or less, preferably one or less. The hydroxyl number of the ester-containing polyol will vary considerably. Generally, however, the polyols will have a hydroxyl number of from about 20 to 600, preferably from about 35 to 400.

In a preferred embodiment of the present invention, the foregoing ester-containing polyols are employed in the preparation of polyurethane compositions, particularly polyurethane foams. The resulting polyurethane products exhibit marked improvements in flame-retardant properties without impairment of the other physical properties of the products. Moreover, the lower viscosity of these polyols enables them to be useful in the preparation of sprayable polyurethane compositions. The polyurethane products are generally prepared by the reaction of the ester-containing polyol with an organic polyisocyanate, optionally in the presence of additional polyhydroxyl-containing components, chain-extending agents, catalysts, surface active agents, stabilizers, blowing agents, fillers, and pigments. Suitable processes for the preparation of cellular polyurethane plastics are disclosed in U.S. Reissue Pat. 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-, hexamethylene-1,6- diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl - 4,4' - biphenyl diisocyanate, and 3,3'-dimethyldiphenylmethane - 4,4' - diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyldiphenylmethane 2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the ester-containing polyol may be employed as the sole polyhydroxyl-containing component or it may be employed along with the polyhydroxyl-containing components commonly employed in the art. Representative of these components are hydroxyl-containing polyesters, polyalkylene polyether polyols, hydroxy-terminated polyurethane polymers, polyhydric polythioethers, polyhydroxyl-containing phosphorus compounds, polyacetals, aliphatic polyols, aliphatic thiols including alkane, alkene, and alkyne thiols having two or more —SH groups; diamines including both aromatic, aliphatic, and heterocyclic diamines, as well as mixtures thereof. Compounds which contain two or more different groups within the above-defined classes may also be used such as, for example, amino alcohols which contain an amino group and a hydroxyl group. Also compounds may be used which contain one —SH group and one —OH group as well as those which contain an amino group and a —SH group.

Any suitable hydroxyl-containing polyester may be used such as are obtained, for example, from polycarboxylic acids and polyalcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha$-$\beta$-diethylsuccinic acid, isophthalic acid, terephthalic acid, hemimellitic acid and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane glycol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, $\alpha$-methyl glucoside, pentaerythritol, and sorbitol. Also included within the term "polyhydric alcohol" are compounds derived from phenol such as 2,2-(4,4'-hydroxyphenyl)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5,000.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in our copending U.S. Patent Application Ser. No. 728,840, filed May 13, 1968, now U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-diamino naphthalene, and 2,4-diamino toluene; aliphatic polyamines such as ethylene diamine, 1,3-propylene diamine, 1,4-butylene diamine, and 1,3-butylene diamine. Alkylene oxide adducts of any of the above polyamines may also be used, particularly propylene oxide adducts of p-amino aniline and ethylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine 1,4-cyclohexane-bis-(methylamine), ethylene diamine, diethylene triamine, N-(2-hydroxypropyl)ethylene diamine, N,N'-di(2-hydroxypropyl)ethylene diamine, piperazine, 2-methylpiperazine, morpholine, and dodecahydro-1,4,19b-tetraazaphenalene.

Any suitable catalyst may be used including tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. 2,846,408.

A wetting agent or surface active agent is generally necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface active agents prepared by the sequential addition of propylene oxide and then ethylene oxide to propylene glycol and the solid or liquid organosilicones have been found particularly desirable. Other surface active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

Along with the ester-containing polyols of the present invention, non-reactive flame retardants may be employed in the preparation of the polyurethane compositions of the present invention. Representative flame retardants include tris-2-chloroethylphosphate, tris-2,3-dibromopropylphosphate, antimony oxide, and polyammonium phosphate.

The following examples illustrate the nature of the invention. All parts are by weight unless otherwise stated.

EXAMPLE I

A reaction vessel equipped with a thermometer, stirrer, nitrogen source, and heat exchange means was charged with 575 parts of an amine polyol prepared by condensing propylene oxide with toluene diamine (hydroxyl number of 390) and 371 parts of chlorendic anhydride. The reaction vessel was then purged with nitrogen, vented to zero p.s.i.g., sealed, and while maintaining the temperature at 140° C., 87 parts of propylene oxide was added to the reaction mixture over a three-hour period. The pressure at the end of the addition was between 30–35 p.s.i.g. After completion of the oxide addition, the reaction mixture was stirred for three hours at 140° C. The reaction mixture was then stripped of volatiles by heating for two hours at 125° C. under a pressure of less than 10 mm. of mercury. The resulting liquid product had the following properties: hydroxyl number—217; acid number—0.4; and 19.8 percent chlorine.

A polyurethane foam was prepared from the above-described liquid amine-based polyol employing the following ingredients: 50 parts of the ester-containing amine-based polyol, 50 parts of an ester-containing polyol prepared by the reaction of equimolar amounts of propylene oxide, tetrabromophthalic anhydride and a neutral phosphate polyol obtained by the reaction of six moles of propylene oxide with one mole of 100 percent phosphoric acid, 56 parts of tolylene diisocyanate, 1.5 parts of a silicone surfactant DC–193, 1.0 part of tetramethylene ethylene diamine, and 26 parts of trichlorofluoromethane. The foam was prepared by spraying the above ingredients in 10' x 10' boxes. The foam had a density of 2.12 lbs./ft.$^3$ and exhibited flame-retardant properties as evidenced by an 89 percent weight retention and a "B" flame height determined in accordance with the Butler Chimney Test.

EXAMPLE II

A reaction vessel equipped as described in Example I was charged with 1492 parts of tetrachlorophthalic anhydride and 2250 parts of an amine polyol prepared by condensing propylene oxide with ethylene diamine (hydroxyl number of 460). The reaction vessel was then purged with nitrogen, vented to zero p.s.i.g., sealed, and heated to 125° C. Over a three-hour period, 455 parts of propylene oxide was added to the reaction mixture maintaining the temperature of the mixture at 125° C. The pressure at the end of the addition was between 20–25 p.s.i.g. After completion of the oxide addition, the reaction mixture was stirred for two hours at 125° C. The reaction mixture was stripped of volatiles by heating for one hour at 125° C. under a pressure of less than 5 mm. of mercury. The resulting liquid product had the following properties: hydroxyl number—221 and 14.1 percent chlorine.

A polyurethane foam was prepared employing 25 parts of the above-described ester-containing polyol along with 55 parts of a polyol prepared by the reaction of propylene oxide with polymeric methylene dianiline, said polyol having a functionality of 2.3 and a hydroxyl number of 337, and tolylene diisocyanate in an amount sufficient to provide an NCO/OH ratio of 1.28:1. Trichlorofluoromethane was employed as blowing agent. The resulting foam exhibited flame-retardant properties.

EXAMPLE III

A reaction vessel equipped as described in Example I was charged with 776 parts of tetrabromophthalic anhydride, 4.78 parts of sodium acetate, and 1956 parts of the amine polyol described in Example II. The reaction vessel was then purged with nitrogen, vented to zero p.s.i.g., and sealed. The reaction mixture was then heated to 140° C. and maintained at this temperature for 0.5 hour. Over a two-hour period, 212 parts of propylene oxide was added to the reaction mixture maintaining the temperature of the mixture at 140° C. After completion of the oxide addition, the reaction mixture was heated to 140° C. and stirred at this temperature for three hours. The reaction mixture was then stripped of volatiles by heating for one hour at 110° C. under a pressure of less than 10 mm. of mercury. The resulting liquid product had the following properties: hydroxyl number—292; acid number—0.4; and 17.9 percent bromine.

A polyurethane foam was prepared employing 15 parts of the above-described ester-containing amine-based polyol, 85 parts of a blend of polyols having a hydroxyl number of approximately 450, 1.0 part of diethylene triamine, 1.0 part of dimethylamino ethanol, 1.0 part of silicone surfactant DC–193, 41 parts of trichlorofluoromethane, and 124 parts of polymethylene polyphenyl isocyanate. The foam exhibited the following physical properties:

Density, pcf. _____ 1.79
Compressive strength, p.s.i.:
   10% deflection _____ 35.6
   At yield point _____ 35.9
Tensile strength, p.s.i. _____ 45.2
Flame Test, D–1692–68:
   (Sec.) _____ 31
   Distance consumed, in. _____ 2.4

EXAMPLE IV

A reaction vessel equipped as described in Example I was charged with 776 parts of tetrabromophthalic anhydride, 4.78 parts of anhydrous sodium acetate, and 1956 parts of an amine-based polyol prepared by reacting ethylene oxide with a condensate of propylene oxide and ethylene diamine, the polyol having a hydroxyl number of 450 and an ethylene oxide content of 10 percent by weight. The reaction vessel was then purged with nitrogen, vented to zero p.s.i.g., and sealed. The reaction mixture was then heated to 140° C. Over a three-hour period, 192 parts of propylene oxide was added to the reaction mixture maintaining the temperature of the mixture at 140° C. The pressure at the end of the addition was between 90–95 p.s.i.g. After completion of the oxide addition, the reaction mixture was heated for three hours at 140° C. and then stripped of volatiles by heating for one hour at 110° C. under a pressure of less than 10 mm. of mercury. The liquid product had the following properties: hydroxyl number—307; acid number—0.5; and 18.0 percent bromine.

A polyurethane foam was prepared employing 15 parts of the above-described ester-containing amine-based polyol, 85 parts of a blend of polyols having a hydroxyl number of approximately 450, 1.0 part of dimethylene triamine, 1.0 parts of dimethylamino ethanol, 1.0 part of silicone surfactant DC–192, 41 parts of trichlorofluoromethane, and 124 parts of polymethylene polyphenyl isocyanate. The foam exhibited the following physical properties:

Density, pcf. _____ 1.78
Compressive strength, p.s.i.:
   10% deflection _____ 33.2
   At yield point _____ 33.7
Tensile strength, p.s.i. _____ 53.1
Flame Test, D–1692–68:
   (Sec.) _____ 33
   Distance consumed, in. _____ 2.1

EXAMPLE V

A reaction vessel equipped as described in Example I was charged with 143 parts of tetrachlorophthalic anhydride, 232 parts of tetrabromophthalic anhydride, 1.4 parts of anhydrous sodium acetate, and 1566 parts of an amine-based polyol prepared by condensing propylene oxide with polymeric methylene dianiline (hydroxyl number of 337 and functionality of 2.3). The reaction vessel was then purged with nitrogen, vented to zero p.s.i.g., and sealed. The reaction mixture was then heated to 140° C. Over a three-hour period, 116 parts of propylene oxide was added to the reaction mixture maintaining the temperature of the mixture at 140° C. The pressure at the end of the addition was between 40–45 p.s.i.g. After completion of the oxide addition, the reaction mixture was heated at 140° C. for three hours and was stripped of volatiles by heating for one hour at 125° C. under a pressure of less than 10 mm. of mercury. The product had the following properties: hydroxy number—252; acid number—0.3; 7.8 percent bromine, and 3.5 percent chlorine.

A polyurethane foam was prepared employing 100 parts of the above-described ester-containing amine-based polyol, 1.5 parts of silicone surfactant DC–193, 1.0 part of tetramethyl ethylene diamine, 66.5 parts of polymethylene polyphenylene isocyanate, and 30 parts of trichlorofluoromethane. The resulting foam had a density of 2.02 lbs./ft.$^3$ and exhibited flame-retardant properties as measured by ASTM D–1692–68 by being self-extinguishing in 23.7 seconds with 1.16 inches consumed.

EXAMPLE VI

A reaction vessel equipped as described in Example I was charged with 232 parts of tetrabromophthalic anhydride, 1.25 parts of anhydrous sodium acetate, 124 parts of an amine-based polyol prepared by the reaction of propylene oxide with toluene diamine (hydroxyl number of 434) and 210.5 parts of a phosphorus polyol prepared by the reaction of propylene oxide with 100 percent phosphoric acid (hydroxyl number of 400). The reaction vessel was then purged with nitrogen, vented to zero p.s.i.g., and sealed. The reaction mixture was then heated to 80° C. Over a three-hour period, 75.5 parts of propylene oxide was added to the reaction mixture maintaining the temperature of the mixture at 80° C. After completion of the oxide addition, the reaction mixture was heated for three hours and stripped of volatiles by heating for one hour at 80° C. under a pressure of less than 10 mm. of mercury. The product had the following properties: hydroxyl number—223; acid number—0.2; and 24.6 percent bromine.

What is claimed is:

1. An ester-containing amine-based liquid polyol prepared by the reaction at a temperature of from 50° C. to 150° C. for 0.5 hour to 10 hours of
   (a) a condensate of an amine having at least two active hydrogen atoms selected from the group consisting of aliphatic amines having from one to twenty carbon atoms and aromatic amines having from six to twelve carbon atoms with an alkylene oxide selected from the group consisting of alkylene oxides having from 2 to 12 carbon atoms, halogenated alkylene oxides having from 2 to 4 carbon atoms and from 1 to 3 halogen atoms and mixtures thereof,
   (b) a halogen-containing organic acid anhydride selected from the group consisting of dichloromaleic anhydride, tetrabromophthalic anhydride, tetrachlorophthalic anhydride, 1,4,5,6,7,7 - hexachlorobicyclo(2.2.1)-5-heptene - 2,3 - dicarboxylic anhydride, hereinafter called chlorendic anhydride, 1,4,5,6,7,7-hexachloro - 2 - methylbicyclo(2.2.1)-5-heptene-2,3-dicarboxylic anhydride, 1,4,5,6,7,7-hexachlorobicyclo(2.2.1)-5-heptene-2-acetic-2-carboxylic anhydride, 5,6,7,8,9,9 - hexachloro - 1,2,3,4,4a,5,8,8a-octahydro-5,8-methano-2,3-naphthalene dicarboxylic anhydride, 1,2,3,4,5,6,7,7 - octachloro-3,6-methano-1,2,3,6-tetrahydrophthalic anhydride and mixtures thereof,
   (c) an alkylene oxide selected from the group consisting of alkylene oxides having from 2 to 12 carbon atoms, halogenated alkylene oxides having from 2 to 4 carbon atoms and from 1 to 3 halogen atoms and mixtures thereof, the mole ratio of (a) to (b) being from 1:0.1 to 1:6 and the amount of (c) employed being such to reduce the acid number of the polyol to one or less.

2. The polyol of claim 1 wherein the amine is ethylene diamine.

3. The polyol of claim 1 wherein the amine is toluene diamine.

4. The polyol of claim 1 wherein the amine is polymeric methylene dianiline.

5. The polyol of claim 1 wherein the anhydride is tetrabromophthalic anhydride.

6. The polyol of claim 1 wherein (c) is propylene oxide.

7. The polyol of claim 1 wherein the mole ratio of (a) to (b) is from 1:0.1 to 1:1.

8. A process for the preparation of an ester-containing amine-based liquid polyol which comprises reacting at a temperature of from 50° C. to 150° C. for 0.5 hour to 10 hours.
   (a) a condensate of an amine having at least two active hydrogen atoms selected from the group consisting of aliphatic amines having from one to twenty carbon atoms and aromatic amines having from six to twelve carbon atoms with an alkylene oxide selected from the group consisting of alkylene oxides having from 2 to 12 carbon atoms, halogenated alkylene oxides having from 2 to 4 carbon atoms and from 1 to 3 halogen atoms and mixtures thereof,
   (b) a halogen-containing organic acid anhydride selected from the group consisting of dichloromaleic anhydride, tetrabromophthalic anhydride, tetrchlorophthalic anhydride, 1,4,5,6,7,7-hexachlorobicyclo(2.2.1)-5-heptene-2,3-dicarboxylic anhydride, hereinafter called chlorendic anhydride, 1,4,5,6,7,7-hexachloro - 2 - methylbicyclo(2.2.1)-5-heptene-2,3-dicarboxylic anhydride, 1,4,5,6,7,7 - hexachlorobicyclo(2.2.1)-5-heptene-2-acetic - 2 - carboxylic anhydride, 5,6,7,8,9,9 - hexachloro-1,2,3,4,4a,5,8,8a-octahydro-5,8-methano-2,3-naphthalene dicarboxylic anhydride, 1,2,3,4,5,6,7,7-octachloro-3,6-methano - 1,2,3,6-tetrahydrophthalic anhydride and mixtures thereof,
   (c) an alkylene oxide selected from the group consisting of alkylene oxides having from 2 to 12 carbon atoms, halogenated alkylene oxides having from 2 to 4 carbon atoms and from 1 to 3 halogen atoms and mixtures thereof, in a mole ratio of (a) to (b) being from 1:0.1 to 1:6 and the amount of (c) employed being such to reduce the acid number of the polyol to one or less.

References Cited

UNITED STATES PATENTS 3,625,988   12/1971   Cyba _____ 260—468

ROBERT GERSTL, Primary Examiner

U.S. Cl. X.R.

260—2.5 AV, 2.5 AQ, 268 PL, 468 G, 475 P, 485 G